(12) United States Patent
Jeong et al.

(10) Patent No.: US 11,953,401 B2
(45) Date of Patent: Apr. 9, 2024

(54) METHOD AND APPARATUS FOR MEASURING OPTICAL CHARACTERISTICS OF AUGMENTED REALITY DEVICE

(71) Applicant: SOOKMYUNG WOMEN'S UNIVERSITY INDUSTRY—ACADEMIC COOPERATION FOUNDATION, Seoul (KR)

(72) Inventors: Young Ju Jeong, Yongin-si (KR); Hea In Jeong, Seoul (KR)

(73) Assignee: SOOKMYUNG WOMEN'S UNIVERSITY INDUSTRY-ACADEMIC COOPERATION FOUNDATION, Seoul (KR)

( * ) Notice: Subject to any disclaimer, the term of this patent is extended or adjusted under 35 U.S.C. 154(b) by 428 days.

(21) Appl. No.: 17/294,579

(22) PCT Filed: Nov. 15, 2019

(86) PCT No.: PCT/KR2019/015628
§ 371 (c)(1),
(2) Date: May 17, 2021

(87) PCT Pub. No.: WO2020/101420
PCT Pub. Date: May 22, 2020

(65) Prior Publication Data
US 2022/0011193 A1    Jan. 13, 2022

(30) Foreign Application Priority Data
Nov. 15, 2018    (KR) .......................... 10-2018-0140736

(51) Int. Cl.
*G01M 11/02*    (2006.01)
*G01B 11/25*    (2006.01)
(Continued)

(52) U.S. Cl.
CPC ....... *G01M 11/0207* (2013.01); *G01B 11/254* (2013.01); *G06T 19/006* (2013.01); *G02B 27/0172* (2013.01)

(58) Field of Classification Search
CPC ............ G01M 11/0207; G01B 11/254; G06T 19/006; G02B 27/0172
See application file for complete search history.

(56) References Cited

FOREIGN PATENT DOCUMENTS

JP    2002511184 A  *  4/2002  ............. H04N 5/222
JP    2016-018213 A    2/2016
(Continued)

*Primary Examiner* — Jamil Ahmed
(74) *Attorney, Agent, or Firm* — NKL Law; Jae Youn Kim

(57) ABSTRACT

A method and apparatus for measuring optical characteristics of an augmented reality device are disclosed. A method of measuring optical characteristics of an augmented reality device according to an exemplary embodiment of the present invention includes: taking a test image including a plurality of patterns that is output on a virtual plane by the augmented reality device, using at least one camera disposed around a predetermined measurement reference position; acquiring field of view information including information about the field of view of the at least one camera, and photographing system information including information about the arrangement of the at least one camera; and calculating the coordinates of a plurality of patterns with respect to the measurement reference position on the basis of a plurality of captured images taken by the at least one camera, field of view information, and photographing system information.

12 Claims, 15 Drawing Sheets

(51) Int. Cl.
*G06T 19/00* (2011.01)
*G02B 27/01* (2006.01)

(56) References Cited

FOREIGN PATENT DOCUMENTS

| | | | | | |
|---|---|---|---|---|---|
| KR | 10-2011-0042971 | A | | 4/2011 | |
| KR | 10-2014-0065210 | A | | 5/2014 | |
| KR | 20140065210 | A | * | 5/2014 | ............ G01B 11/00 |
| KR | 10-2015-0055184 | A | | 5/2015 | |
| KR | 20150055184 | A | * | 5/2015 | ............ G02B 27/01 |
| KR | 10-2017-0114375 | A | | 10/2017 | |
| KR | 10-2018-0070431 | A | | 6/2018 | |

* cited by examiner

METHOD AND APPARATUS FOR MEASURING OPTICAL CHARACTERISTICS OF AUGMENTED REALITY DEVICE

TECHNICAL FIELD

The present invention relates to a method and apparatus for measuring optical characteristics of an augmented reality device, and more particularly, to a method and apparatus for measuring optical characteristics of 3D virtual images produced by an augmented reality device.

BACKGROUND ART

An augmented reality (AR), which is a field of the virtual reality (AR), is a computer graphic technique that makes objects look like objects existing in the original environment by combining virtual objects or information with an actual environment, and is frequently used for digital media.

An augmented reality shows a combination of an actual reality and a virtual reality having additional information in real time through one image, so it is also called a mixed reality (MR). A hybrid VR system that combines a real environment and a virtual environment has been studied and developed with U.S. as a leader since the late 1990s.

For example, an augmented reality may be used for remote medical diagnosis, broadcasting, architectural design, manufacturing process management, etc. Further, smartphones are recently generally popularized, a full-scale commercialization step has set in and various products are being developed even in the game and mobile solution industry, the educational field, etc.

Meanwhile, wearable computers may be an example of realizing an augmented reality outdoors. In particular, a head mounted display (HMD) that is worn on the head puts computer graphics, letters, etc. upon one another and shows them in real time in a real environment that a user sees, thereby enabling an augment reality. Further, a head up display (HUD) enables an augment reality by showing various items of information for driving a vehicle outside the windshield of the vehicle.

For example, an HUD shows a light source, which is output outside a windshield from the inside of a vehicle, on a virtual plane positioned outside the windshield of the vehicle so that a driver can obtain information for driving the vehicle from the virtual plane even without moving his/her gaze while driving, thereby being able to achieve an augmented reality.

Geometric characteristics such as the position of a virtual plane that is formed by individual augmented reality devices such as an HMD and an HUD may be determined in accordance with the optical characteristics of corresponding augmented reality devices.

Accordingly, a need for a method and apparatus that can measure optical characteristics in relation to the output of augmented reality devices is on the rise.

As related prior art, there is Korean Patent Application Publication No. 10-2017-0114375 (Title of invention: Method and apparatus for display of virtual reality contents, publication date: Oct. 16, 2017).

DISCLOSURE

Technical Problem

The present invention has been made to provide a method and apparatus for measuring optical characteristics of a virtual image produced by an augmented reality device.

Further, the present invention has been made to provide a method and apparatus for calculating a virtual image distance, a look down/up angle of a virtual image, a horizontal/vertical field of view, a static distortion, a ghosting level, etc. with respect to a user of an augmented reality device, using optical characteristics of a virtual image produced by an augmented reality device.

The objective(s) of the present invention is not limited to those described above and (an)other objectives may be made apparent to those skilled in the art from the following description.

Technical Solution

In order to achieve the objectives described above, a method of measuring optical characteristics of an augmented reality device provided by the present invention includes: taking a test image including a plurality of patterns that is output on a virtual plane by the augmented reality device, using at least one camera disposed around a predetermined measurement reference position; acquiring field of view information including information about a field of view of the at least one camera, and photographing system information including information about arrangement of the at least one camera; and calculating coordinates of a plurality of patterns with respect to the measurement reference position on the basis of a plurality of captured images taken by the at least one camera, the field of view information, and the photographing system information.

Preferably, when the at least one camera includes a central camera positioned at the measurement reference position, and a left camera and a right camera symmetrically positioned with the measurement reference position therebetween and when a plurality of patterns is horizontally and vertically arranged in one test image, the calculating of coordinates of a plurality of patterns may calculate the coordinates of the plurality of patterns, using the number of horizontal pixels of the plurality of captured images, coordinates of the plurality of patterns in the plurality of captured images, a field of view of the at least one camera included in the field of view information, and a distance between the left camera and the right camera included in the photographing system information.

Preferably, when the at least one camera takes a picture at a central photographing position where it takes a picture at the measurement reference position, and a left photographing position and a right photographing position symmetrically positioned with the measurement reference position therebetween and when a plurality of patterns is horizontally and vertically arranged in one test image, the calculating of coordinates of a plurality of patterns may calculate the coordinates of the plurality of patterns, using the number of horizontal pixels of the plurality of captured images, coordinates of the plurality of patterns in the plurality of captured images, a field of view of the at least one camera included in the field of view information, and a distance between the left photographing position and the right photographing position included in the photographing system information.

Preferably, the calculating of coordinates of a plurality of patterns may calculate the coordinates of the plurality of patterns, using Formula 1.

$$z_{ij} = \frac{\alpha}{2 \cdot \tan \frac{\theta}{2}} \cdot \frac{M}{(m_{ij}^L - m_{ij}^R)} \quad \text{[Formula 1]}$$

-continued $$x_{ij} = z_{ij} \cdot \tan\frac{\theta}{2}(2 \cdot \frac{m^C_{ij}}{M} - 1)$$

$$y_{ij} = z_{ij} \cdot \tan\frac{\theta}{2}(2 \cdot \frac{n^C_{ij}}{M} - 1)$$

where $x_{ij}$, $y_{ij}$, and $z_{ij}$ are x-axial, y-axial, and z-axial coordinates of the horizontal i-th and vertical j-th pattern with respect to the measurement reference position, $\alpha$ is the distance between the left camera and the right camera, M is the number of horizontal pixels of a plurality of captured images, $\theta$ is the field of view of the plurality of cameras, $m^L_{ij}$ is the horizontal coordinate of the horizontal i-th and vertical j-th pattern in the captured image of the left camera, $m^R_{ij}$ is the horizontal coordinate of the horizontal i-th and vertical j-th pattern in the captured image of the right camera, and $m^C_{ij}$ is the horizontal coordinate of the horizontal i-th and vertical j-th pattern in the captured image of the central camera.

Preferably, the method may further include calculating a virtual image distance between the measurement reference position and the virtual plane, using coordinates of the measurement reference position and coordinates of at least one of the plurality of patterns.

Preferably, the calculating of a virtual image distance may calculate the virtual image distance, using Formula 2.

$$D_{VI} = \sqrt{x_{22}^2 + y_{22}^2 + z_{22}^2} \quad \text{[Formula 2]}$$

where $D_{VI}$ is the virtual image distance, and $x_{22}$, $y_{22}$, and $z_{22}$ are coordinates of one of the plurality of patterns.

Preferably, the method may further include calculating a look down/up angle to the virtual plane from the measurement reference position, using the coordinates of the measurement reference position and the coordinates of at least one of the plurality of patterns.

Preferably, the calculating of a look down/up angle may calculate the look down/up angle, using Formula 3.

$$\theta_{down/up} = \cos^{-1}\frac{\sqrt{x_{22}^2 + z_{22}^2}}{\sqrt{x_{22}^2 + y_{22}^2 + z_{22}^2}} \quad \text{[Formula 3]}$$

where $\theta_{down/up}$ is the look down/up angle, and $x_{22}$, $y_{22}$, and $z_{22}$ are the coordinates of one of the plurality of patterns.

Preferably, the method may further include calculating a horizontal field of view of the measurement reference position, using the coordinates of the measurement reference position and coordinates of two patterns positioned at both horizontal ends of the plurality of patterns on the virtual plane.

Preferably, the calculating of a horizontal field of view may calculate the horizontal field of view, using Formula 4.

$$\theta^H_{FOV} = \cos^{-1}\frac{\|\overline{P_{21}O}\|^2 + \|\overline{P_{23}O}\|^2 - \|\overline{P_{21}P_{23}}\|^2}{2 \cdot \|\overline{P_{21}O}\|\|\overline{P_{23}O}\|} \quad \text{[Formula 4]}$$

where $\theta^H_{FOV}$ is the horizontal field of view, O is the coordinate of the measurement reference position, and $P_{21}$ and $P_{23}$ are the coordinates of two patterns positioned at both horizontal ends.

Preferably, the method may further include calculating a vertical field of view of the measurement reference position, using the coordinates of the measurement reference position and coordinates of two patterns positioned at both vertical ends of the plurality of patterns on the virtual plane.

Preferably, the calculating of a vertical field of view may calculate the vertical field of view, using Formula 5.

$$\theta^V_{FOV} = \cos^{-1}\frac{\|\overline{P_{12}O}\|^2 + \|\overline{P_{32}O}\|^2 - \|\overline{P_{12}P_{32}}\|^2}{2 \cdot \|\overline{P_{12}O}\|\|\overline{P_{32}O}\|} \quad \text{[Formula 5]}$$

where $\theta^V_{FOV}$ is the vertical field of view, O is the coordinate of the measurement reference position, and $P_{12}$ and $P_{32}$ are the coordinates of two patterns positioned at both vertical ends.

Preferably, the method may further include calculating a static distortion for each of three axes with respect to the measurement reference position on the basis of the coordinates of the plurality of patterns on the virtual plane.

Preferably, the calculating of coordinates of a plurality of patterns may further calculate coordinates of a plurality of ghost patterns corresponding to the plurality of pattern, respectively, and the method may further include calculating ghosting levels on the basis of the coordinates of the plurality of patterns and the coordinates of the plurality of ghost patterns.

In order to achieve the objectives described above, an apparatus for measuring optical characteristics of an augmented reality device provided by the present invention includes: a photographing unit that takes a test image including a plurality of patterns that is output on a virtual plane by the augmented reality device, using at least one camera disposed around a predetermined measurement reference position; an acquiring unit that acquires field of view information including information about the field of view of the at least one camera, and photographing system information including information about the arrangement of the at least one camera; and a calculating unit that calculates the coordinates of a plurality of patterns with respect to the measurement reference position on the basis of a plurality of captured images taken by the at least one camera, field of view information, and photographing system information.

Preferably, when the at least one camera includes a central camera positioned at the measurement reference position, and a left camera and a right camera symmetrically positioned with the measurement reference position therebetween and when a plurality of patterns is horizontally and vertically arranged in one test image, the calculating unit may calculate the coordinates of the plurality of patterns, using the number of horizontal pixels of the plurality of captured images, coordinates of the plurality of patterns in the plurality of captured images, a field of view of the at least one camera included in the field of view information, and a distance between the left camera and the right camera included in the photographing system information.

Preferably, when the at least one camera takes a picture at a central photographing position where it takes a picture at the measurement reference position, and a left photographing position and a right photographing position symmetrically positioned with the measurement reference position therebetween and when a plurality of patterns is horizontally and vertically arranged in one test image, the calculating unit may calculate the coordinates of the plurality of patterns, using the number of horizontal pixels of the plurality of captured images, coordinates of the plurality of patterns in the plurality of captured images, a field of view of the at least one camera included in the field of view information, and a distance between the left photographing position and the right photographing position included in the photographing system information.

Preferably, the calculating unit may calculate coordinates of the plurality of patterns, using Formula 6.

$$z_{ij} = \frac{\alpha}{2 \cdot \tan\frac{\theta}{2}} \cdot \frac{M}{(m_{ij}^L - m_{ij}^R)}$$

$$x_{ij} = z_{ij} \cdot \tan\frac{\theta}{2}\left(2 \cdot \frac{m_{ij}^c}{M} - 1\right)$$

$$y_{ij} = z_{ij} \cdot \tan\frac{\theta}{2}\left(2 \cdot \frac{n_{ij}^c}{M} - 1\right)$$

[Formula 6]

where $x_{ij}$, $y_{ij}$, and $z_{ij}$ are x-axial, y-axial, and z-axial coordinates of the horizontal i-th and vertical j-th pattern with respect to the measurement reference position, $\alpha$ is the distance between the left camera and the right camera, M is the number of horizontal pixels of a plurality of captured images, $\theta$ is the field of view of the plurality of cameras, $m^L_{ij}$ is the horizontal coordinate of the horizontal i-th and vertical j-th pattern in the captured image of the left camera, $m^R_{ij}$ is the horizontal coordinate of the horizontal i-th and vertical j-th pattern in the captured image of the right camera, and $m^C_{ij}$ is the horizontal coordinate of the horizontal i-th and vertical j-th pattern in the captured image of the central camera.

Preferably, the calculating unit may further calculate a virtual image distance between the measurement reference position and the virtual plane, using coordinates of the measurement reference position and coordinates of at least one of the plurality of patterns on the virtual plane.

Preferably, the calculating unit may calculate the virtual image distance, using Formula 7.

$$D_{VI} = \sqrt{x_{22}^2 + y_{22}^2 + z_{22}^2}$$

[Formula 7]

where $D_{VI}$ is the virtual image distance, and $x_{22}$, $y_{22}$, and $z_{22}$ are coordinates of one of the plurality of patterns.

Preferably, the calculating unit may further calculate a look down/up angle from the measurement reference position to the virtual plane, using coordinates of the measurement reference position and coordinates of at least one of the plurality of patterns on the virtual plane.

Preferably, the calculating unit may calculate the look down/up angle, using Formula 8.

$$\theta_{down/up} = \cos^{-1}\frac{\sqrt{x_{22}^2 + z_{22}^2}}{\sqrt{x_{22}^2 + y_{22}^2 + z_{22}^2}}$$

[Formula 8]

where $\theta_{down/up}$ is the look down/up angle, and $x_{22}$, $y_{22}$, and $z_{22}$ are the coordinates of one of the plurality of patterns.

Preferably, the calculating unit may further calculate a horizontal field of view of the measurement reference position, using the coordinates of the measurement reference position and coordinates of two patterns positioned at both horizontal ends of the plurality of patterns on the virtual plane.

Preferably, the calculating unit may calculate the horizontal field of view, using Formula 9.

$$\theta^H_{FOV} = \cos^{-1}\frac{\|\overline{P_{21}O}\|^2 + \|\overline{P_{23}O}\|^2 - \|\overline{P_{21}P_{23}}\|^2}{2 \cdot \|\overline{P_{21}O}\|\|\overline{P_{23}O}\|}$$

[Formula 9]

where $\theta^H_{FOV}$ is the horizontal field of view, O is the coordinate of the measurement reference position, and $P_{21}$ and $P_{23}$ are the coordinates of two patterns positioned at both horizontal ends.

Preferably, the calculating unit may further calculate a vertical field of view of the measurement reference position, using the coordinates of the measurement reference position and coordinates of two patterns positioned at both vertical ends of the plurality of patterns on the virtual plane.

Preferably, the calculating unit may calculate the vertical field of view, using Formula 10.

$$\theta^V_{FOV} = \cos^{-1}\frac{\|\overline{P_{12}O}\|^2 + \|\overline{P_{32}O}\|^2 - \|\overline{P_{12}P_{32}}\|^2}{2 \cdot \|\overline{P_{12}O}\|\|\overline{P_{32}O}\|}$$

[Formula 10]

where $\theta^V_{FOV}$ is the vertical field of view, O is the coordinate of the measurement reference position, and $P_{12}$ and $P_{32}$ are the coordinates of two patterns positioned at both vertical ends.

Preferably, the calculating unit may further calculate a static distortion for each of three axes with respect to the measurement reference position on the basis of the coordinates of the plurality of patterns on the virtual plane.

Preferably, the calculating unit may further calculate coordinates of a plurality of ghost patterns corresponding to the plurality of patterns, respectively, on the basis of the plurality of captured images, the field of view information, and the photographing system information, and may further calculate ghosting levels on the basis of the coordinates of the plurality of patterns and the coordinates of the plurality of ghost patterns.

Advantageous Effects

The present invention has an effect that it is possible to easily measure optical characteristics of a virtual image produced by an augmented reality device, using at least one camera.

Further, the prevent invention has an effect that it is possible to calculate a virtual image distance, a look down/up angle of a virtual image, a horizontal/vertical field of view, a static distortion, a ghosting level, etc. with respect to a user of an augmented reality device, using optical characteristics of a virtual image produced by an augmented reality device.

BEST MODE

Figure 1:
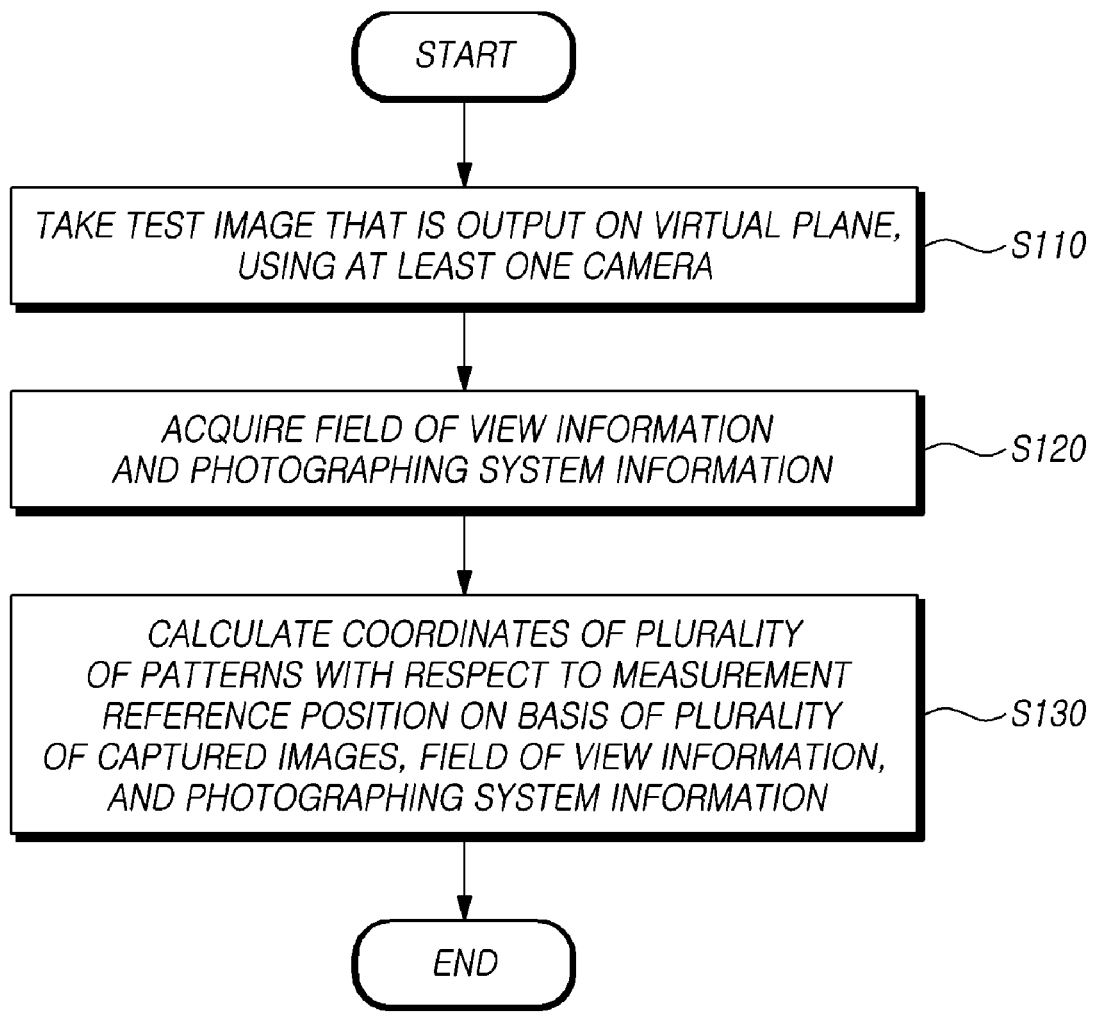
FIG. 1 is a flowchart showing a method of measuring optical characteristics of an augmented reality device according to an exemplary embodiment of the present invention.

The present invention may be modified in various ways and implemented by various exemplary embodiments, so that specific exemplary embodiments are shown in the drawings and will be described in detail herein. However, it is to be understood that the present invention is not limited to the specific exemplary embodiments, but includes all modifications, equivalents, and substitutions included in the spirit and the scope of the present invention. Similar reference numerals are assigned to similar components in the following description of drawings.

Terms used in the specification, 'first', 'second', 'A', 'B', etc., may be used to describe various components, but the components are not to be construed as being limited to the terms. The terms are used only to distinguish one component from another component. For example, the 'first' component may be named the 'second' component, and vice versa, without departing from the scope of the present invention. The term 'and/or' includes a combination of a plurality of relevant items or any one of a plurality of relevant terms.

It is to be understood that when one element is referred to as being "connected to" or "coupled to" another element, it may be connected directly to or coupled directly to another element or be connected to or coupled to another element, having the other element intervening therebetween. On the other hand, it should be understood that when one element is referred to as being "connected directly to" or "coupled directly to" another element, it may be connected to or coupled to another element without the other element intervening therebetween.

Terms used in the present specification are used only to describe specific exemplary embodiments rather than limiting the present invention. Singular forms are intended to include plural forms unless the context clearly indicates otherwise. It will be further understood that the terms "comprises" or "have" used in this specification, specify the presence of stated features, numerals, steps, operations, components, parts, or a combination thereof, but do not preclude the presence or addition of one or more other features, numerals, steps, operations, components, parts, or a combination thereof.

Unless defined otherwise, it is to be understood that all the terms used in the specification including technical and scientific terms have the same meaning as those that are understood by those who are skilled in the art. It will be further understood that terms such as terms defined in common dictionaries should be interpreted as having a meaning that is consistent with their meaning in the context of this specification and the relevant art and will not be interpreted in an idealized or overly formal sense unless expressly so defined herein.

Hereinafter, preferred exemplary embodiments of the present invention will be described in detail with reference to the accompanying drawings.

Figure 9A:
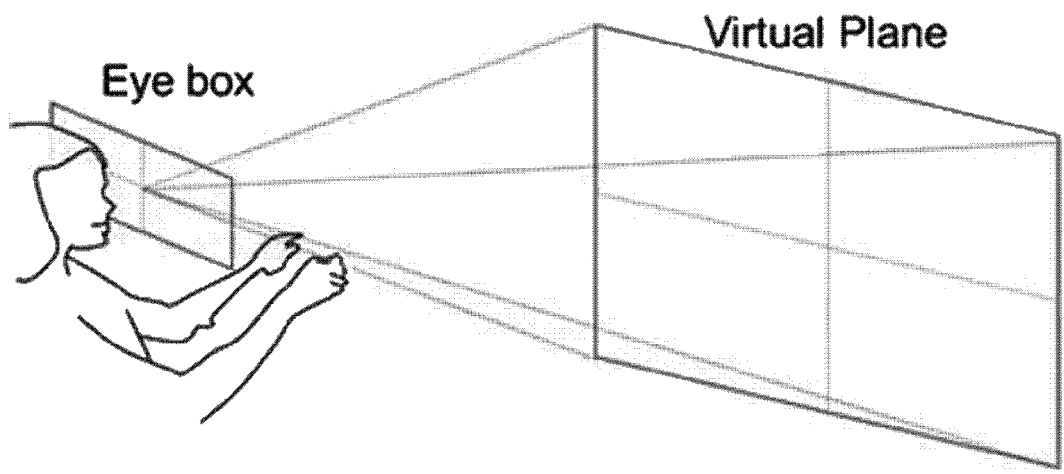
FIGS. 9A and 9B are diagrams for explaining an environment for measuring optical characteristics of an augmented reality device according to an exemplary embodiment of the present invention.

The present invention relates to a method and apparatus for measuring optical characteristics of an augmented reality device and measurement may be performed under the following environments. For example, referring to FIG. 9A, the eyes of a user may be positioned in an eye box and a virtual plane output by a virtual reality device may be formed outside a transparent or translucent screen (e.g., the windshield of a vehicle). In this case, the user can see the entire virtual plane by moving only the eyes. Further, referring to FIG. 9B, a plurality of cameras may be disposed around a measurement reference position in an eye box. In more detail, $cam_C$ may be disposed at the measurement reference position, and $cam_L$ and $cam_R$ may be disposed at symmetric positions at both sides thereof. Meanwhile, a plurality of patterns may be horizontally and vertically arranged (e.g., 3×3) in a test image.

However, it should be noted that the present invention is not limited as being achieved only in this environment and may be achieved in various different environments. For example, the position and size of the eye box, the number and arrangement of cameras, the number and arrangement of patterns included in the test image, etc. may depend on the measurement environment.

FIG. 1 is a flowchart showing a method of measuring optical characteristics of an augmented reality device according to an exemplary embodiment of the present invention.

In step S110, an apparatus for measuring optical characteristics takes a test image including a plurality of patterns that is output on a virtual plane by an augmented reality device, using at least one camera disposed around a predetermined measurement reference position.

Figure 9B:
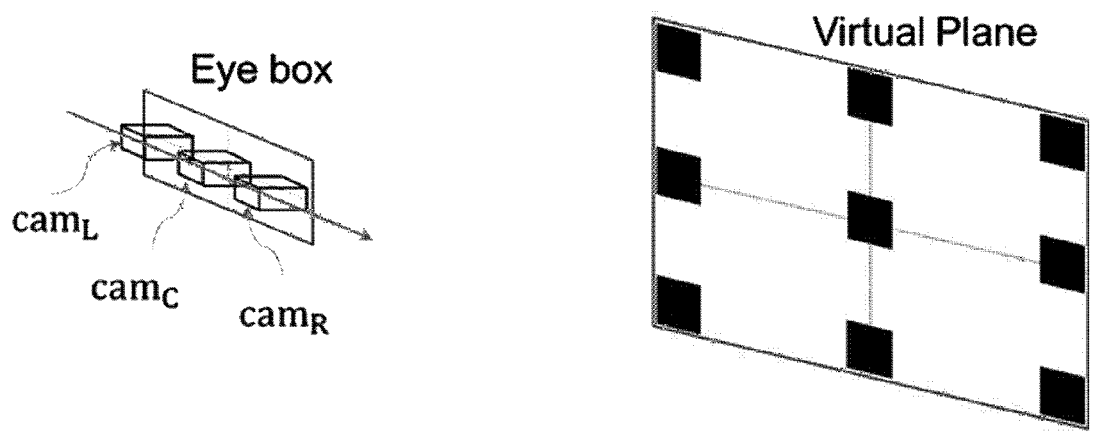

For example, referring to FIG. 9B, one camera may be disposed at a measurement reference position at the center of the eye box, and the other cameras may be symmetrically disposed to face the front at the same heights at both sides thereof.

In this case, the apparatus for measuring optical characteristics is connected with a plurality of cameras through wireless or wired, thereby being able to transmit an instruction to take a test image on the virtual plane.

Further, one camera may take a test image at a plurality of positions while moving. For example, one camera may move along the arrow shown in FIG. 9B and may take a test image at each of the $cam_L$ position (left position of the measurement reference position), $cam_C$ position (measurement reference position), and $cam_R$ position (right position of the measurement reference position).

Meanwhile, the example described above is only an exemplary embodiment of the present invention and the right range of the present invention should not be limited to the example described above.

In step S120, the apparatus for measuring optical characteristics acquires field of view information including information about the field of view of the at least one camera, and photographing system information including information about the arrangement of the at least one camera.

For example, the apparatus for measuring optical characteristics may acquire field of view information and photographing system information by receiving information of the field of view of a camera and information about the arrangement of a camera from a user. Preferably, the information about the field of view of a camera may be a horizontal field of view and the information about the arrangement of a camera may be the distance between cameras symmetrically disposed at both sides of the measurement reference position. Alternatively, as described above, when one camera takes a test image while moving, the photographing system information may be the distance between a left photographing position and a right photographing position symmetrically defined at both sides of the measurement reference position.

Finally, in step S130, the apparatus for measuring optical characteristics calculates the coordinates of a plurality of patterns with respect to the measurement reference position on the basis of a plurality of captured images taken by the at least one camera, field of view information, and photographing system information.

In this case, the apparatus for measuring optical characteristics may calculate 3D coordinates of a plurality of patterns on a virtual plane having the measurement reference position as the origin (0, 0, 0), using information about the sizes of a plurality of captured images, information about the coordinates of a plurality of patterns included in the plurality of captured images in the images, information about the field of view of at least one camera, and information about the arrangement of the at least one camera.

Meanwhile, a detailed method of calculating the coordinates of a plurality of patterns will be described in detail in the following exemplary embodiment.

In another exemplary embodiment, when the at least one camera includes a central camera positioned at the measurement reference position, and a left camera and a right camera symmetrically positioned with the measurement reference position therebetween and when a plurality of patterns is horizontally and vertically arranged in one test image, the apparatus for measuring optical characteristics may calculate the coordinates of a plurality of patterns, using the number of horizontal pixels of a plurality of captured images, the coordinates of a plurality of patterns in the plurality of captured images, the field of view of the at least one camera included in field of view information, and the distance between the left camera and the right camera included in the photographing system information.

For example, referring to FIG. 9B, at least one camera may be a central camera $cam_C$ positioned at the measurement reference position, and a left camera $cam_L$ and a right camera $cam_R$ symmetrically positioned with the measurement reference position therebetween. Further, nine patterns may be horizontally and vertically arranged in a test image.

In this case, the apparatus for measuring optical characteristics may calculate the 3D coordinates of each of the nine patterns on the virtual plane having the measurement reference position as the origin (0, 0, 0), using the number of horizontal pixels of a plurality of captured images, the coordinates of a plurality of patterns in the plurality of captured images, the field of view of the at least one camera included in field of view information, and the distance between the left camera and the right camera included in photographing system information.

In another exemplary embodiment, when the apparatus for measuring optical characteristics takes pictures at a central photographing position where the at least one camera takes a picture at the measurement reference position, and a left photographing position and a right photographing position that are symmetrically positioned with the measurement reference position therebetween and the plurality of patterns is horizontally and vertically arranged in the test image, the apparatus for measuring optical characteristics may calculate the coordinates of the plurality of patterns, using the number of horizontal pixels of the plurality of captured images, the coordinates of the plurality of patterns in the plurality of captured images, the field of view of the at least one camera included in the field of view information, and the distance between the left photographing position and the right photographing position included in the photographing system information.

In another exemplary embodiment, the apparatus for measuring optical characteristics may calculate the coordinates of a plurality of patterns, using Formula 1.

$$z_{ij} = \frac{\alpha}{2 \cdot \tan\frac{\theta}{2}} \cdot \frac{M}{(m_{ij}^L - m_{ij}^R)} \qquad \text{[Formula 1]}$$

$$x_{ij} = z_{ij} \cdot \tan\frac{\theta}{2}\left(2 \cdot \frac{m_{ij}^C}{M} - 1\right)$$

$$y_{ij} = z_{ij} \cdot \tan\frac{\theta}{2}\left(2 \cdot \frac{n_{ij}^C}{M} - 1\right)$$

where $x_{ij}$, $y_{ij}$, and $z_{ij}$ are x-axial, y-axial, and z-axial coordinates of the horizontal i-th and vertical j-th pattern with respect to the measurement reference position, $\alpha$ is the distance between the left camera and the right camera, M is the number of horizontal pixels of a plurality of captured images, $\theta$ is the field of view of at least one camera, $m^L_{ij}$ is the horizontal coordinate of the horizontal i-th and vertical j-th pattern in the captured image of the left camera, $m^R_{ij}$ is the horizontal coordinate of the horizontal i-th and vertical j-th pattern in the captured image of the right camera, and $m^C_{ij}$ is the horizontal coordinate of the horizontal i-th and vertical j-th pattern in the captured image of the central camera.

Figure 10:
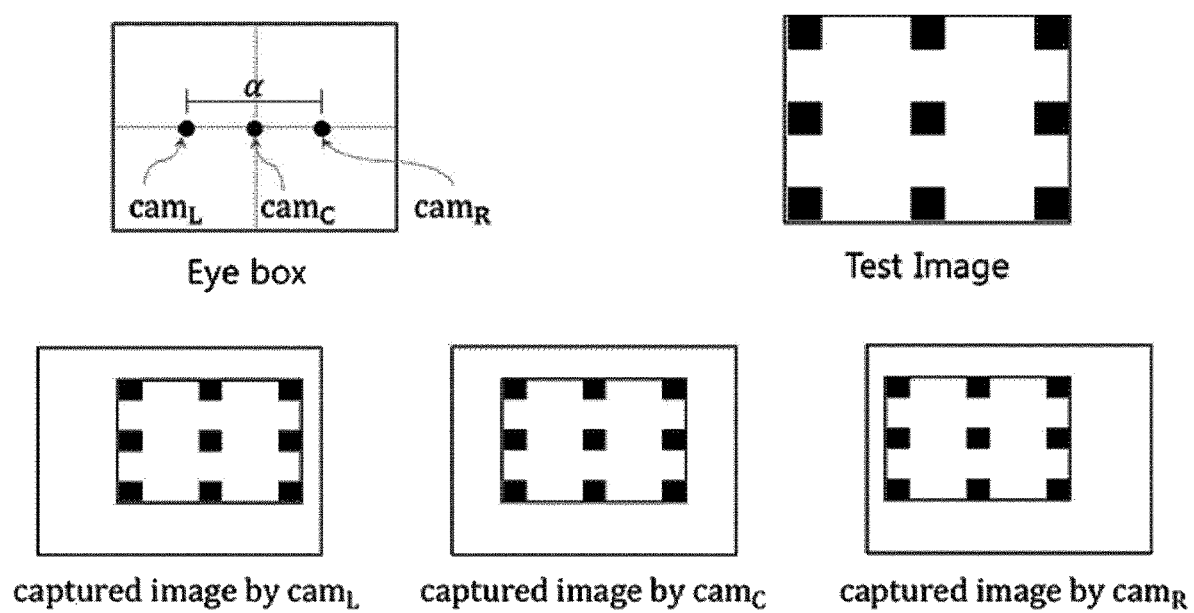
FIG. 10 is a diagram for explaining the result of taking a test image on a virtual plane using at least one camera according to an exemplary embodiment of the present invention.

In this case, referring to FIG. 10, a central camera $cam_C$ may be disposed at the measurement reference position that is the center of an eye box, and left camera $cam_L$ and a right camera $cam_R$ may be disposed with a distance a therebetween. Further, the apparatus for measuring optical characteristics may take a test image on a virtual plane, using the central camera $cam_C$, the left camera $cam_L$, and the right camera $cam_R$ that are disposed to face the front. As a result, the test image of the captured image by $cam_L$ taken using the left camera $cam_L$ may be biased to the right, the test image of the captured image by $cam_C$ taken using the central camera $cam_C$ may not be biased, and the test image of the captured image by $cam_R$ taken using the right camera $cam_R$ may be biased to the left.

Figure 11A:
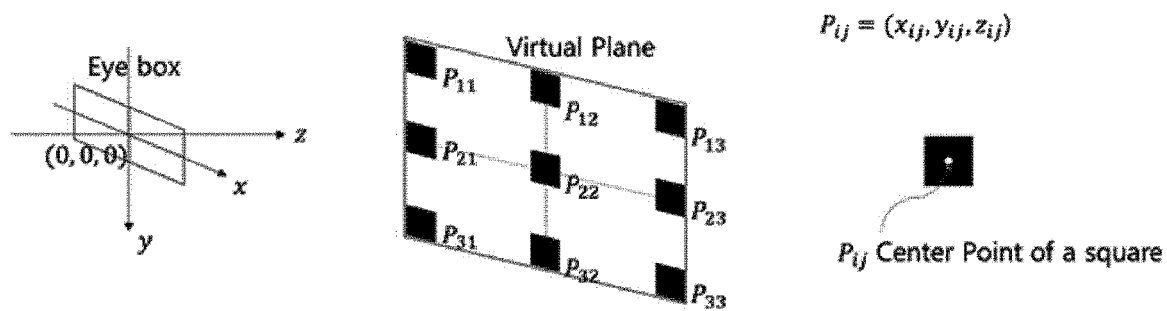
FIGS. 11A and 11B are diagrams for explaining the coordinates of a plurality of patterns included in a captured image taken using at least one camera according to an exemplary embodiment of the present invention.

Meanwhile, referring to FIG. 11A, the 3D coordinates of nine patterns shown in a virtual plane may be expressed by $P_{ij}=(x_{ij}, y_{ij}, z_{ij})$, where I may be the horizontal index (i=1, 2, 3) of the patterns and j may be the vertical index (j=1, 2, 3) of the patterns. That is, $P_{ij}$ may be the 3D coordinates of the center of the horizontal i-th and vertical j-th pattern.

Figure 11B:
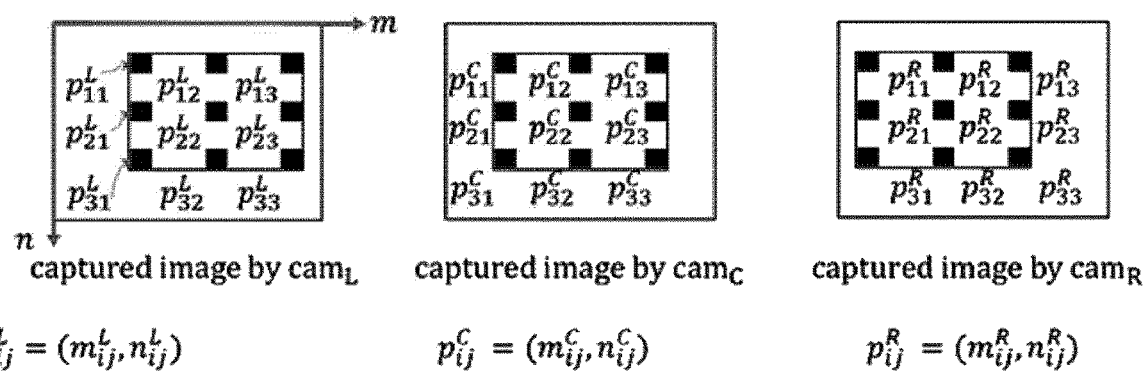

Further, referring FIG. 11B, the pixel coordinates of nine patterns shown in a captured image may be expressed as $P^L_{ij}$, $P^C_{ij}$, and $P^R_{ij}$, and may mean the coordinates of patterns shown in the captured image of each of the left camera $cam_L$, the central camera $cam_C$, and the right camera $cam_R$. In this case, $P^L_{ij}=(m^L_{ij}, n^L_{ij})$, $P^C_{ij}=(m^C_{ij}, n^C_{ij})$, and $P^R_{ij}=(m^R_{ij}, n^R_{ij})$. In this case, $P^L_{ij}$, $P^C_{ij}$, and $P^R_{ij}$ may be pixel coordinates of the center of the horizontal i-th and vertical j-th pattern.

Figure 12A:
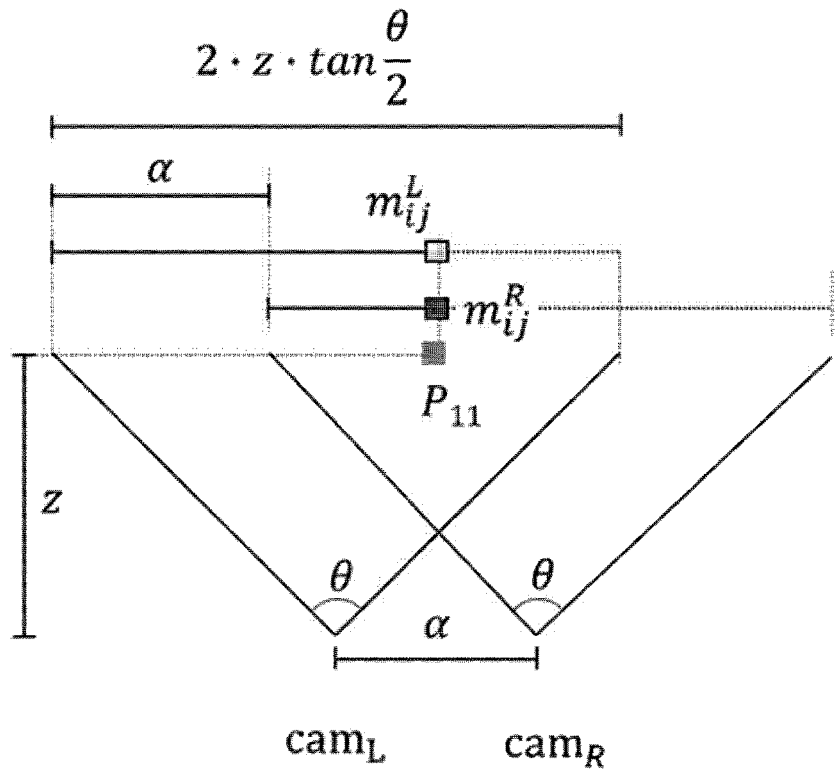
FIGS. 12A and 12B are diagrams for explaining a method of calculating the coordinates of a plurality of patterns according to an exemplary embodiment of the present invention.

Meanwhile, referring to FIG. 12A, it can be seen that a proportional relationship like the following Formula 2 is formed.

$$\frac{\alpha}{2 \times z \times \tan(\theta/2)} = \frac{m^L_{ij} - m^R_{ij}}{M} \quad \text{[Formula 2]}$$

where z is the z-axial distance from a measurement reference position to a virtual plane, θ is the field of view of a camera, α is the distance between a left camera and a right camera, $m^L_{ij}$ is the horizontal coordinate of a horizontal i-th and vertical j-th pattern in the captured image of the left camera, $m^R_{ij}$ is the horizontal coordinate of a horizontal i-th and vertical j-th pattern in the captured image of the right camera, and M is the number of horizontal pixels of a captured image.

In this case, it is apparent that Formula 1 may be obtained by changing Formula 2.

Figure 12B:
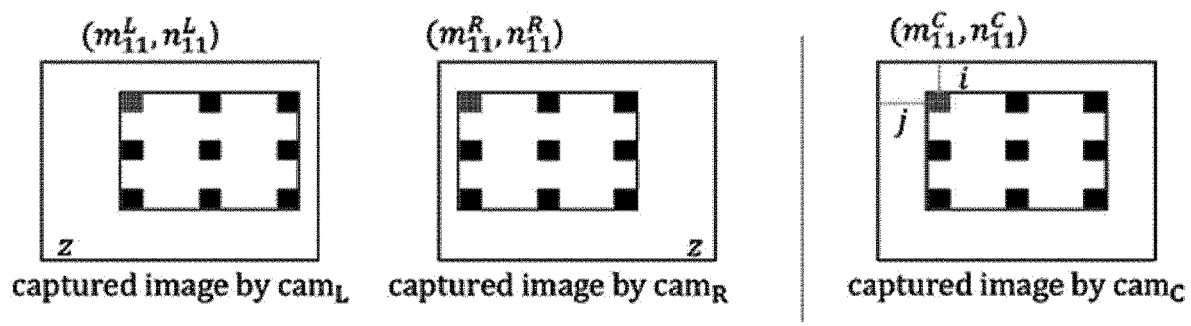

For example, referring to FIG. 12B, the apparatus for measuring optical characteristics may calculate $x_{11}$, $y_{11}$, and $z_{11}$ through Formula 1, using the result of taking pictures using the central camera $cam_C$, the left camera $cam_L$, and the right camera $cam_R$ for the same pattern (i=1 and j=1).

Figure 2:
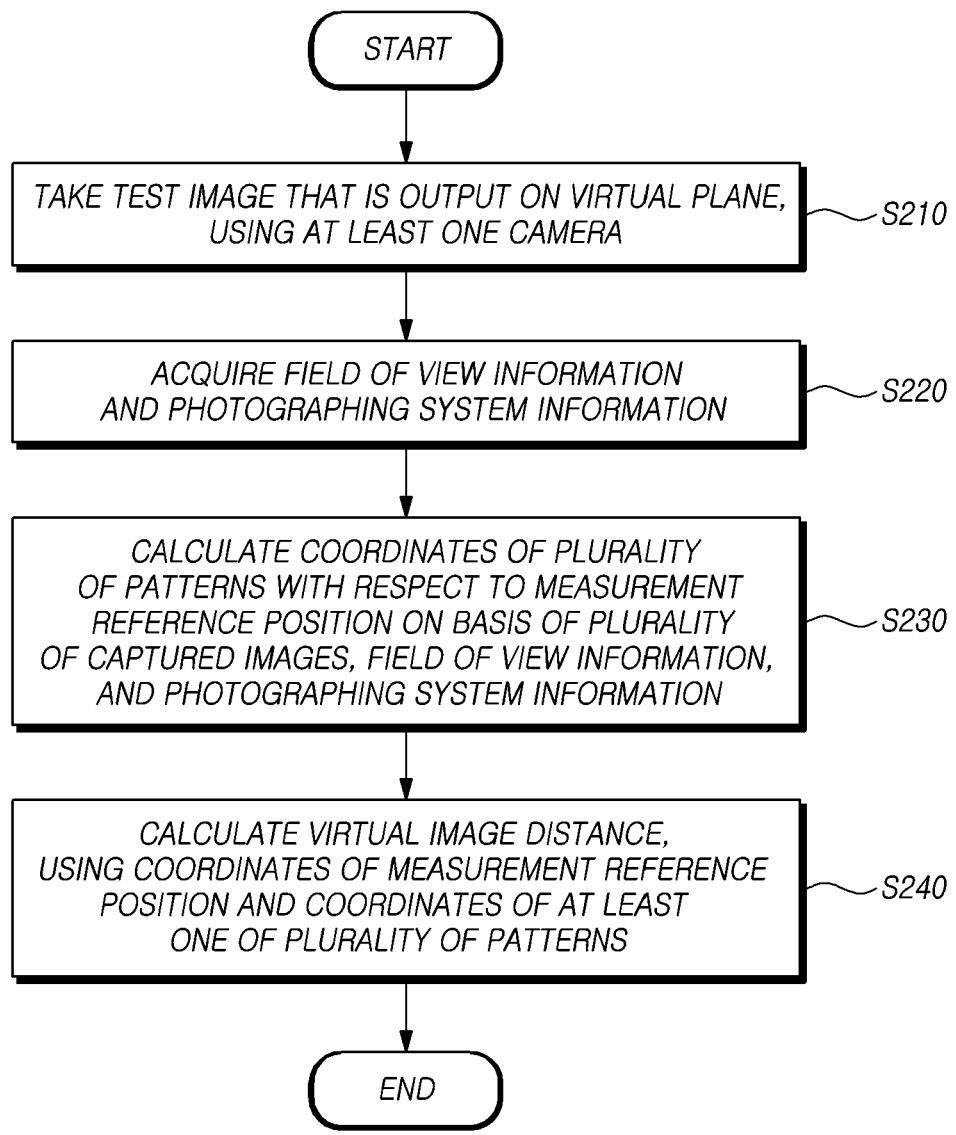
FIG. 2 is a flowchart showing a method of calculating a virtual image distance according to an exemplary embodiment of the present invention.

FIG. 2 is a flowchart showing a method of calculating a virtual image distance according to an exemplary embodiment of the present invention.

In step S210, an apparatus for measuring optical characteristics takes a test image including a plurality of patterns that is output on a virtual plane by an augmented reality device, using at least one camera disposed around a predetermined measurement reference position.

In step S220, the apparatus for measuring optical characteristics acquires field of view information including information about the field of view of the at least one camera, and photographing system information including information about the arrangement of the at least one camera.

In step S230, the apparatus for measuring optical characteristics calculates the coordinates of a plurality of patterns with respect to the measurement reference position on the basis of a plurality of captured images taken by the at least one camera, field of view information, and photographing system information.

Finally, in step S240, the apparatus for measuring optical characteristics calculates a virtual image distance between the measurement reference position and the virtual plane, using the coordinates of the measurement reference position and the coordinates of at least one of the plurality of patterns.

Figure 13:
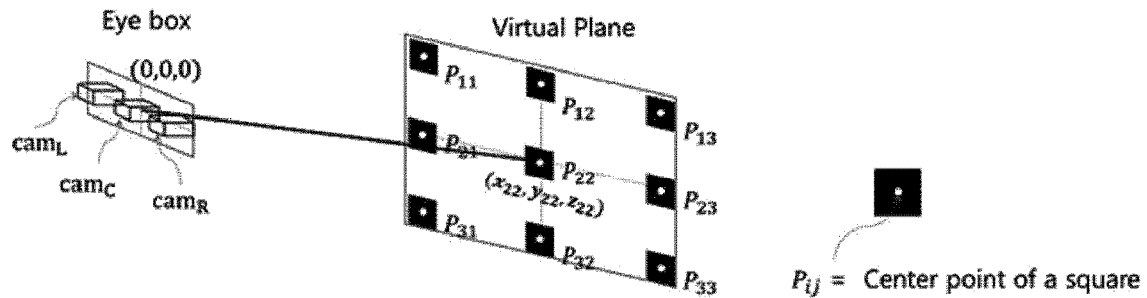
FIG. 13 is a diagram for explaining a method of calculating a virtual image distance according to an exemplary embodiment of the present invention.

For example, referring to FIG. 13, the apparatus for measuring optical characteristics may calculate a virtual image distance by calculating the distance from (0, 0, 0) that is the measurement reference position to the coordinates $(x_{22}, y_{22}, z_{22})$ of $P_{22}$.

In another exemplary embodiment, the apparatus for measuring optical characteristics may calculate a virtual image distance, using Formula 3.

$$D_{VI}=\sqrt{x_{22}^2+y_{22}^2+z_{22}^2} \quad \text{[Formula 3]}$$

where $D_{VI}$ is a virtual image distance, and $x_{22}$, $y_{22}$, and $z_{22}$ are 3D coordinates of the pattern of i=2 and j=2.

Figure 3:
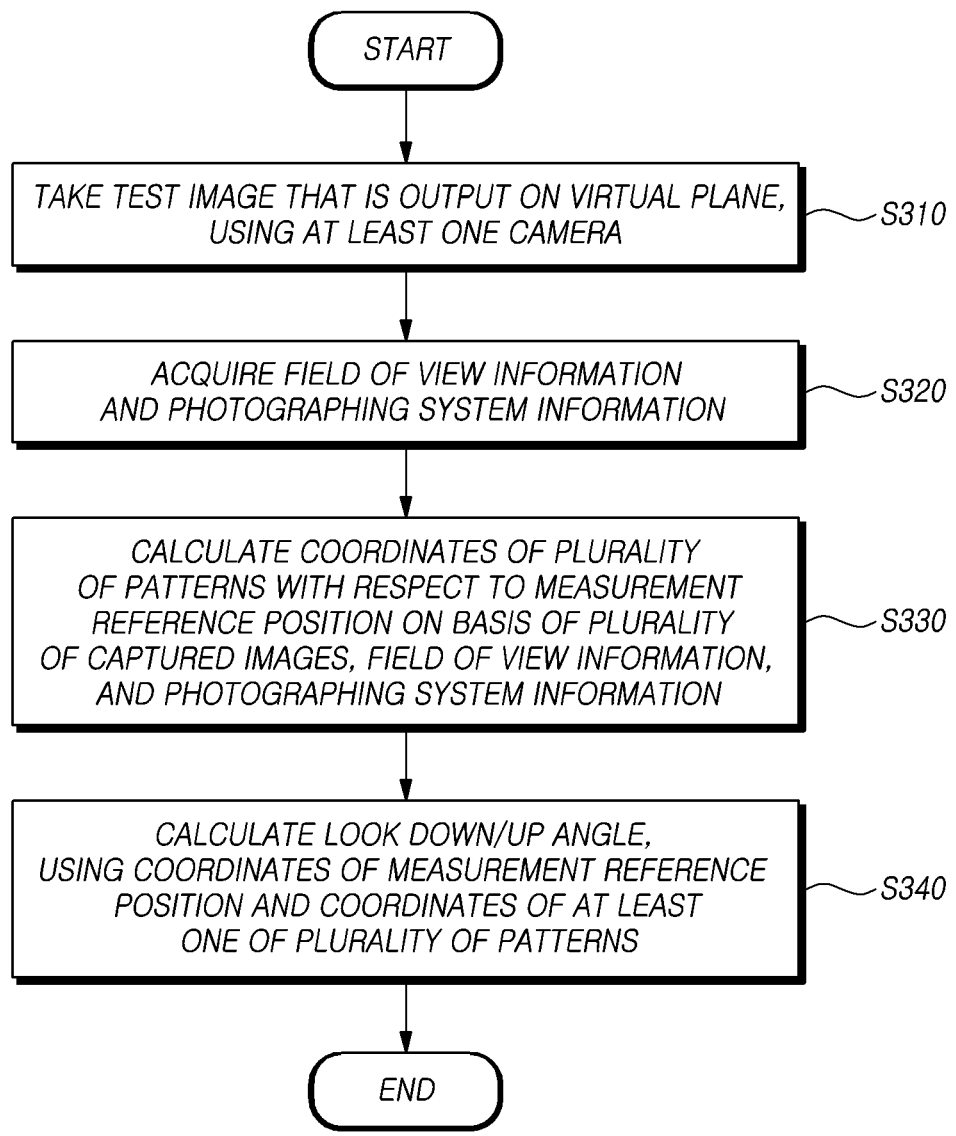
FIG. 3 is a flowchart showing a method of calculating a look down/up angle according to an exemplary embodiment of the present invention.

FIG. 3 is a flowchart showing a method of calculating a look down/up angle according to an exemplary embodiment of the present invention.

In step S310, an apparatus for measuring optical characteristics takes a test image including a plurality of patterns that is output on a virtual plane by an augmented reality device, using at least one camera disposed around a predetermined measurement reference position.

In step S320, the apparatus for measuring optical characteristics acquires field of view information including information about the field of view of the at least one camera, and photographing system information including information about the arrangement of the at least one camera.

In step S330, the apparatus for measuring optical characteristics calculates the coordinates of a plurality of patterns with respect to the measurement reference position on the basis of a plurality of captured images taken by the at least one camera, field of view information, and photographing system information.

Finally, in step S340, the apparatus for measuring optical characteristics calculates a look down/up angle to the virtual plane from the measurement reference position, using the coordinates of the measurement reference position and the coordinates of at least one of the plurality of patterns.

The look down/up angle, which is the angle showing the height difference between an eye box and a virtual plane, shows whether a user looks up or looks down the virtual plane.

Figure 14A:
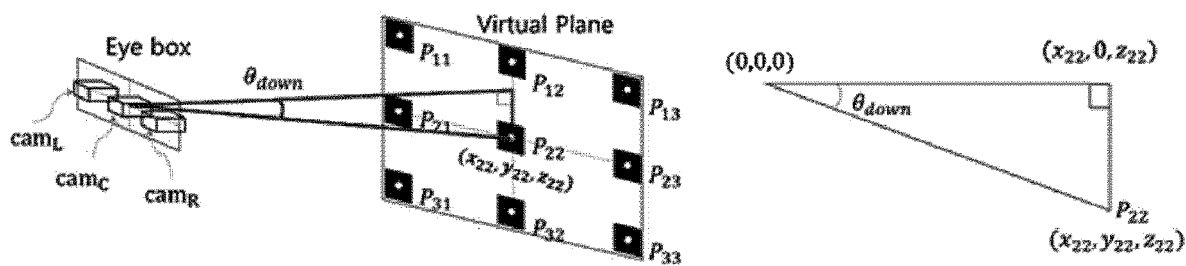
FIGS. 14A and 14B are diagrams for explaining a method of calculating a look down/up angle according to an exemplary embodiment of the present invention.
Figure 14B:
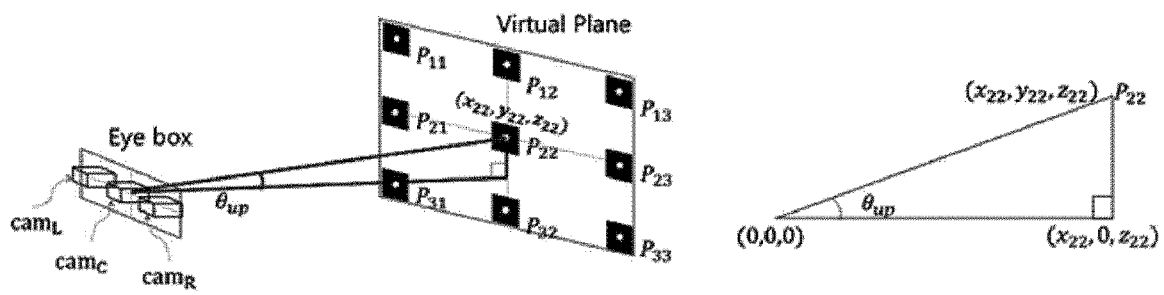

For example, when the coordinates $(x_{22}, y_{22}, z_{22})$ of $P_{22}$ are calculated with respect to (0, 0, 0) that is the measurement reference position where the user's eyes are positioned, it may be a looking-down situation if $y_{22}<0$, as shown in FIG. 14A, and it may be a looking-up situation if $y_{22}>0$, as shown in FIG. 14B.

In another exemplary embodiment, the apparatus for measuring optical characteristics may calculate look down/up angle, using Formula 4.

$$\theta_{down/up} = \cos^{-1}\frac{\sqrt{x_{22}^2+z_{22}^2}}{\sqrt{x_{22}^2+y_{22}^2+z_{22}^2}} \quad \text{[Formula 4]}$$

where $\theta_{down/up}$ is a look down/up angle, and $x_{22}$, $y_{22}$, and $z_{22}$ are 3D coordinates of the pattern of i=2 and j=2.

Figure 4:
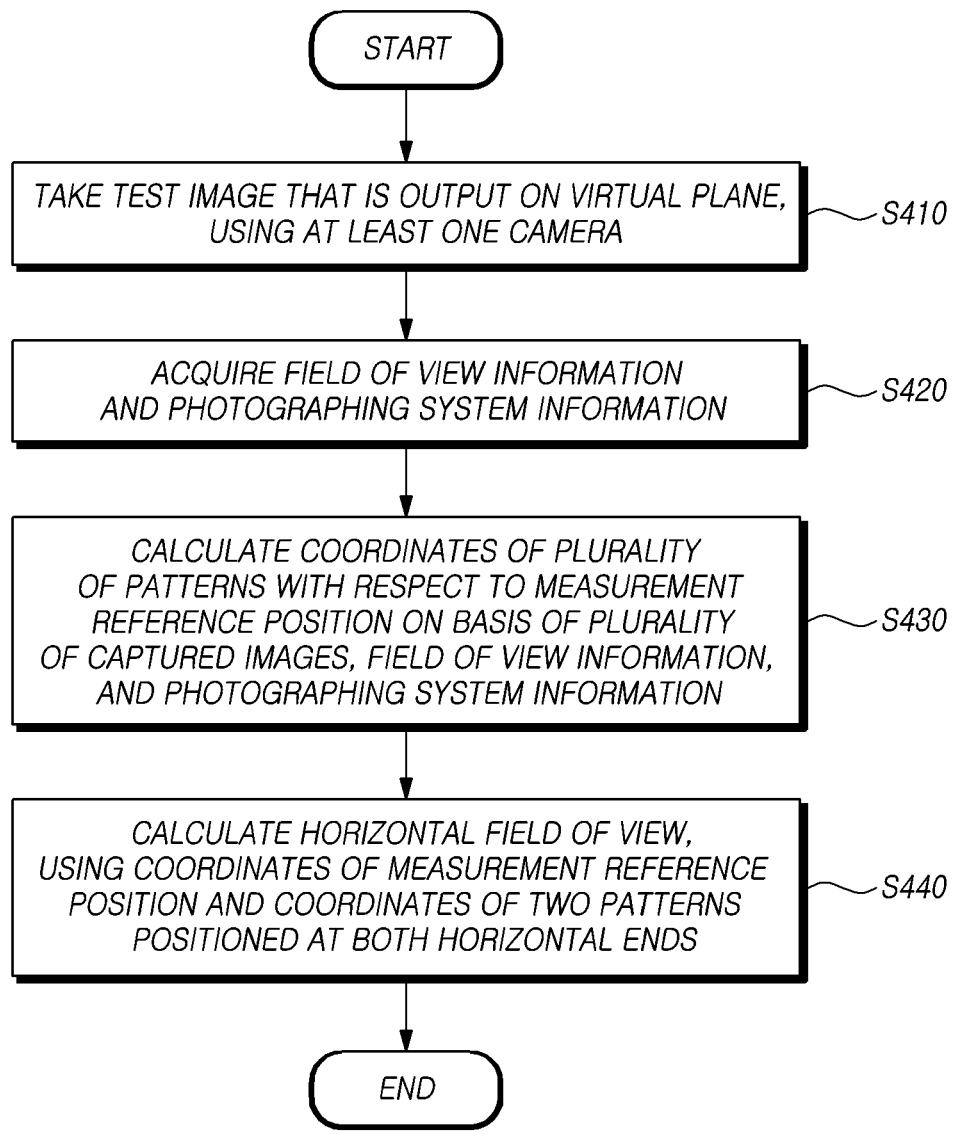
FIG. 4 is a flowchart showing a method of calculating a horizontal field of view according to an exemplary embodiment of the present invention.

FIG. 4 is a flowchart showing a method of calculating a horizontal field of view according to an exemplary embodiment of the present invention.

In step S410, an apparatus for measuring optical characteristics takes a test image including a plurality of patterns that is output on a virtual plane by an augmented reality device, using at least one camera disposed around a predetermined measurement reference position.

In step S420, the apparatus for measuring optical characteristics acquires field of view information including information about the field of view of the at least one camera, and photographing system information including information about the arrangement of the at least one camera.

In step S430, the apparatus for measuring optical characteristics calculates the coordinates of a plurality of patterns with respect to the measurement reference position on the basis of a plurality of captured images taken by the at least one camera, field of view information, and photographing system information.

Finally, in step S440, the apparatus for measuring optical characteristics calculates the horizontal field of view of the measurement reference position, using the coordinates of the measurement reference position and the coordinates of two patterns positioned at both horizontal ends of the plurality of patterns on the virtual plane.

Figure 15A:
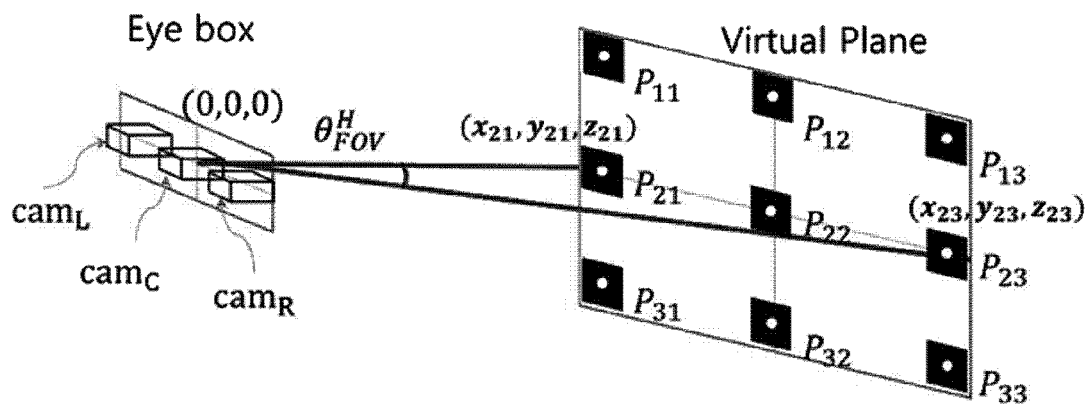
FIGS. 15A and 15B are diagrams for explaining a method of calculating a horizontal field of view and a vertical field of view of a plurality of patterns according to an exemplary embodiment of the present invention.

For example, referring to FIG. 15A, the apparatus for measuring optical characteristics may calculate an angle $\angle P_{21}OP_{23}$ as a horizontal field of view, using the 3D coordinates O=(0, 0, 0) of the measurement reference position and the 3D coordinates of two patterns $P_{21}=(x_{21}, y_{21}, z_{21})$ and $P_{23}=(x_{23}, y_{23}, z_{23})$ positioned at both horizontal ends of the plurality of patterns on the virtual plane.

In another exemplary embodiment, the apparatus for measuring optical characteristics may calculate a horizontal field of view, using Formula 5.

$$\theta^H_{FOV} = \cos^{-1} \frac{\|\overline{P_{21}O}\|^2 + \|\overline{P_{23}O}\|^2 - \|\overline{P_{21}P_{23}}\|^2}{2 \cdot \|\overline{P_{21}O}\|\|\overline{P_{23}O}\|} \qquad \text{[Formula 5]}$$

where $\theta^H_{FOV}$ is a horizontal field of view, O is the coordinate of a measurement reference position, and $P_{21}$ and $P_{23}$ are coordinates of two patterns positioned at both horizontal ends of a plurality of patterns.

Figure 5:
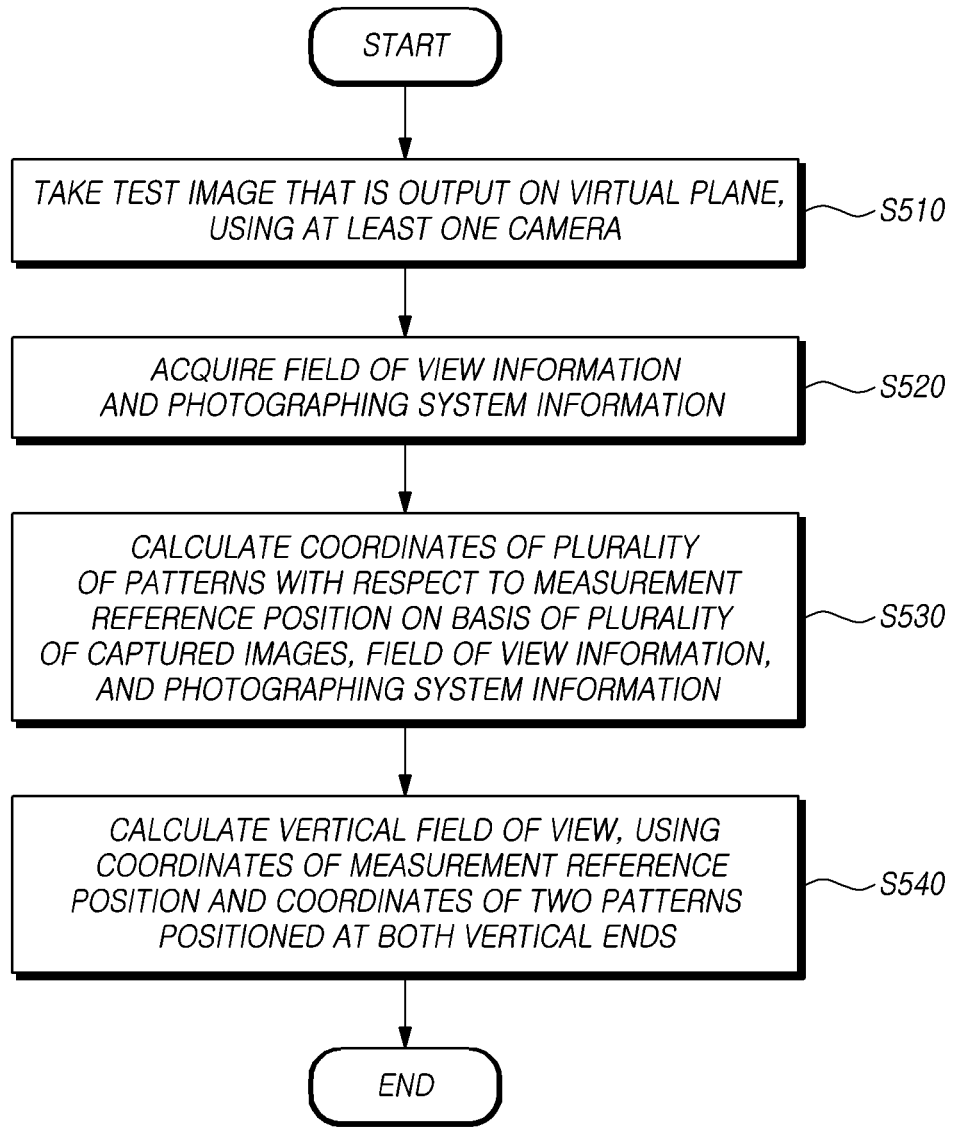
FIG. 5 is a flowchart showing a method of calculating a vertical field of view according to an exemplary embodiment of the present invention.

FIG. 5 is a flowchart showing a method of calculating a vertical field of view according to an exemplary embodiment of the present invention.

In step S510, an apparatus for measuring optical characteristics takes a test image including a plurality of patterns that is output on a virtual plane by an augmented reality device, using at least one camera disposed around a predetermined measurement reference position.

In step S520, the apparatus for measuring optical characteristics acquires field of view information including information about the field of view of the at least one camera, and photographing system information including information about the arrangement of the plurality of cameras.

In step S530, the apparatus for measuring optical characteristics calculates the coordinates of a plurality of patterns with respect to the measurement reference position on the basis of a plurality of captured images taken by the at least one camera, field of view information, and photographing system information.

Finally, in step S540, the apparatus for measuring optical characteristics calculates the vertical field of view of the measurement reference position, using the coordinates of the measurement reference position and the coordinates of two patterns positioned at both vertical ends of the plurality of patterns on the virtual plane.

Figure 15B:
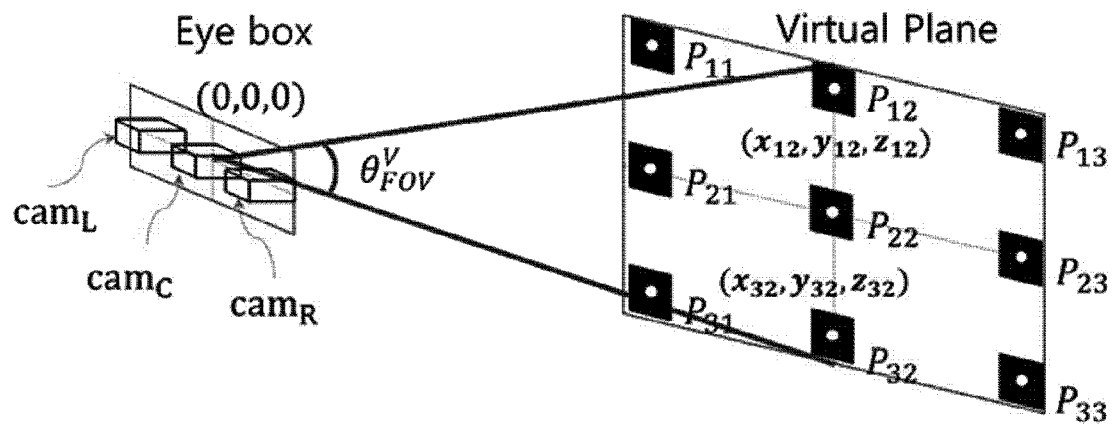

For example, referring to FIG. 15B, the apparatus for measuring optical characteristics may calculate an angle $\angle P_{12}OP_{32}$ as a vertical field of view, using the 3D coordinates O=(0, 0, 0) of the measurement reference position and the 3D coordinates of two patterns $P_{12}=(x_{12}, y_{12}, z_{12})$ and $P_{32}=(x_{32}, y_{32}, z_{32})$ positioned at both vertical ends of the plurality of patterns on the virtual plane.

In another exemplary embodiment, the apparatus for measuring optical characteristics may calculate a vertical field of view, using Formula 6.

$$\theta^V_{FOV} = \cos^{-1} \frac{\|\overline{P_{12}O}\|^2 + \|\overline{P_{32}O}\|^2 - \|\overline{P_{12}P_{32}}\|^2}{2 \cdot \|\overline{P_{12}O}\|\|\overline{P_{32}O}\|} \qquad \text{[Formula 6]}$$

where $\theta^V_{FOV}$ is a vertical field of view, O is the coordinate of a measurement reference position, and $P_{12}$ and $P_{32}$ are coordinates of two patterns positioned at both vertical ends.

Figure 6:
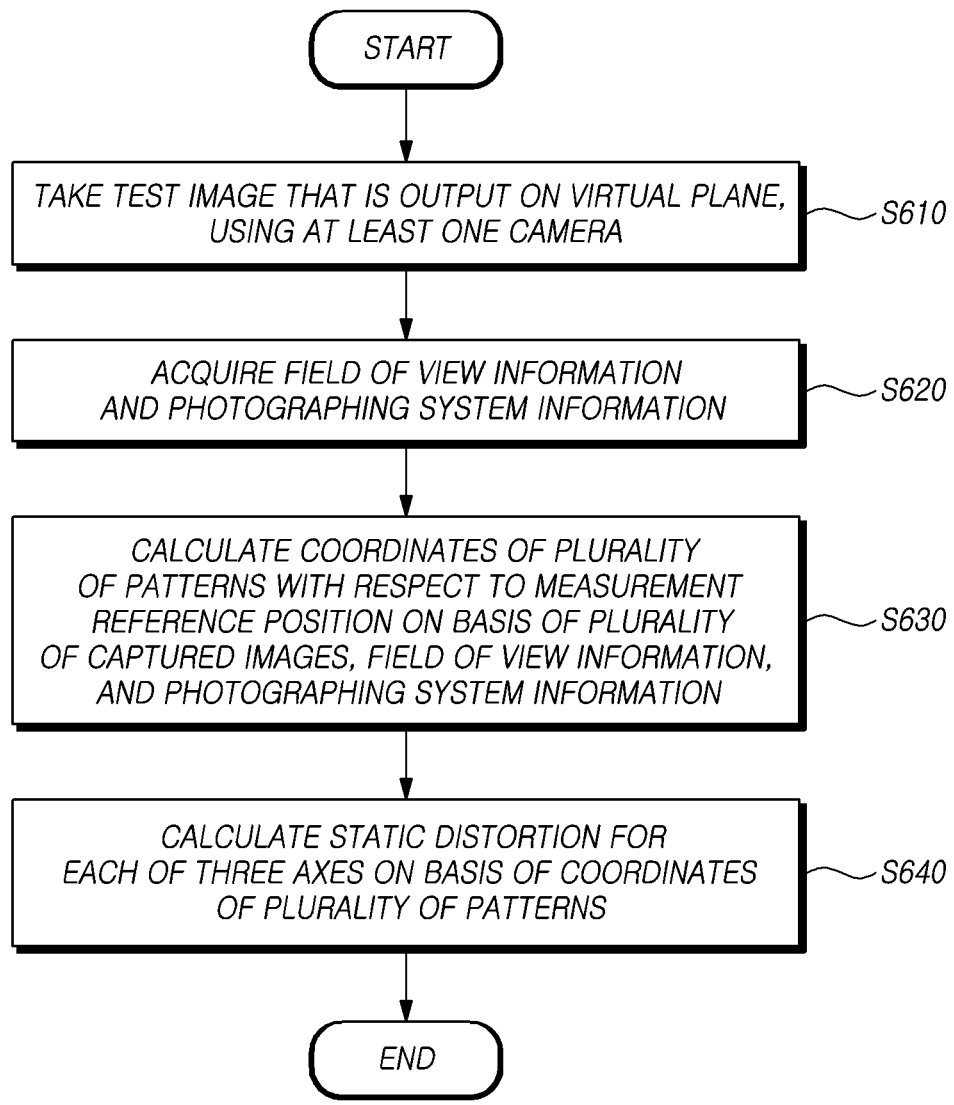
FIG. 6 is a flowchart showing a method of calculating a static distortion according to an exemplary embodiment of the present invention.

FIG. 6 is a flowchart showing a method of calculating a static distortion according to an exemplary embodiment of the present invention.

In step S610, an apparatus for measuring optical characteristics takes a test image including a plurality of patterns that is output on a virtual plane by an augmented reality device, using at least one camera disposed around a predetermined measurement reference position.

In step S620, the apparatus for measuring optical characteristics acquires field of view information including information about the field of view of the at least one camera, and photographing system information including information about the arrangement of the at least one camera.

In step S630, the apparatus for measuring optical characteristics calculates the coordinates of a plurality of patterns with respect to the measurement reference position on the basis of a plurality of captured images taken by the at least one camera, field of view information, and photographing system information.

Finally, in step S640, the apparatus for measuring optical characteristics calculates a static distortion for each of three axes with respect to the measurement reference position on the basis of the coordinates of the plurality of patterns on the virtual plane.

Figure 16:
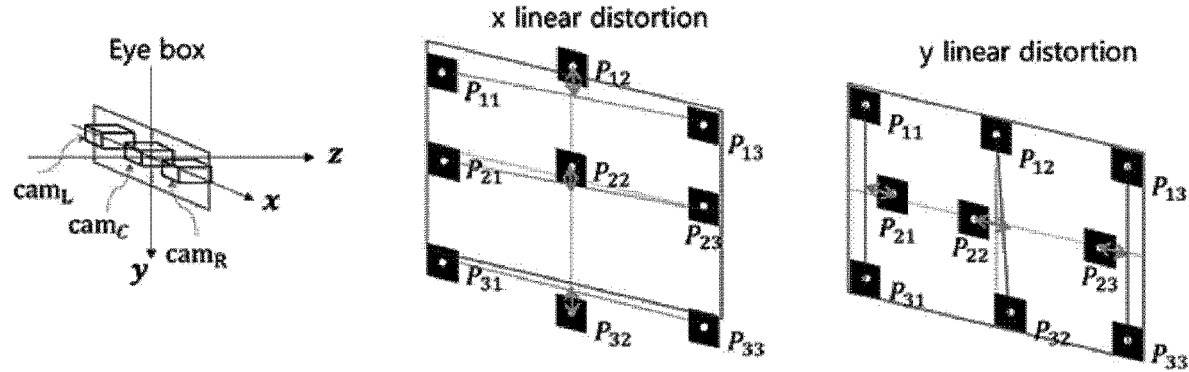
FIG. 16 is a diagram for explaining a method of calculating a static distortion according to an exemplary embodiment of the present invention.

In this case, referring to FIG. 16, the static distortion, which is induced by projection of a virtual reality device, shows the deviation degree of 3D coordinates of a plurality of patterns from a line corresponding to each of three axes (x, y, z).

Meanwhile, the apparatus for measuring optical characteristics may calculate a static distortion for each of three axes, using Formula 7.

$$DT^x_{Linearity} = \frac{\sum_{i=1}^{3} |x_{i1} + x_{i3} - 2x_{i2}|}{3} \qquad \text{[Formula 7]}$$

$$DT^y_{Linearity} = \frac{\sum_{i=1}^{3} |y_{1i} + y_{3i} - 2y_{2i}|}{3}$$

-continued $$DT^z_{Linearity} = \frac{\sum_{i=1}^{3}|z_{1i}+z_{3i}-2z_{2i}|}{6} + \frac{\sum_{i=1}^{3}|z_{i1}+z_{i3}-2z_{i2}|}{6}$$

where $DT^x_{Linearity}$, $DT^y_{Linearity}$, and $DT^z_{Linearity}$ are linear distortion values from x, y, and z axes, respectively, and $x_{ab}$, $y_{ab}$, and $z_{ab}$ are x, y, and z coordinates of the horizontal a-th (a=1, 2, 3) and vertical b-th (b=1, 2, 3) pattern, respectively.

Figure 7:
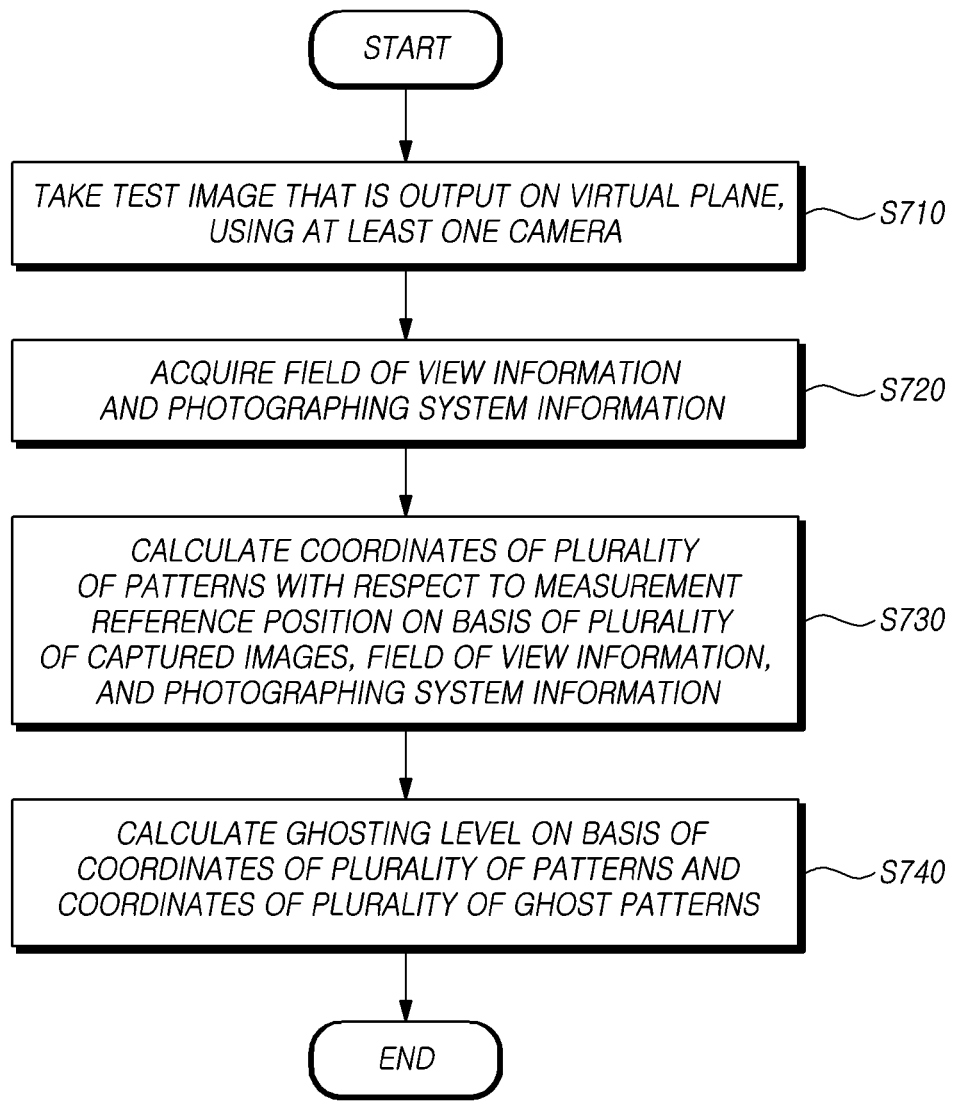
FIG. 7 is a flowchart showing a method of calculating a ghosting level according to an exemplary embodiment of the present invention.

FIG. 7 is a flowchart showing a method of calculating a ghosting level according to an exemplary embodiment of the present invention.

In step S710, an apparatus for measuring optical characteristics takes a test image including a plurality of patterns that is output on a virtual plane by an augmented reality device, using at least one camera disposed around a predetermined measurement reference position.

In step S720, the apparatus for measuring optical characteristics acquires field of view information including information about the field of view of the at least one camera, and photographing system information including information about the arrangement of the at least one camera.

In step S730, the apparatus for measuring optical characteristics calculates the coordinates of a plurality of patterns and the coordinates of a plurality of ghost patterns with respect to the measurement reference position on the basis of a plurality of captured images taken by the at least one camera, field of view information, and photographing system information.

Figure 17:
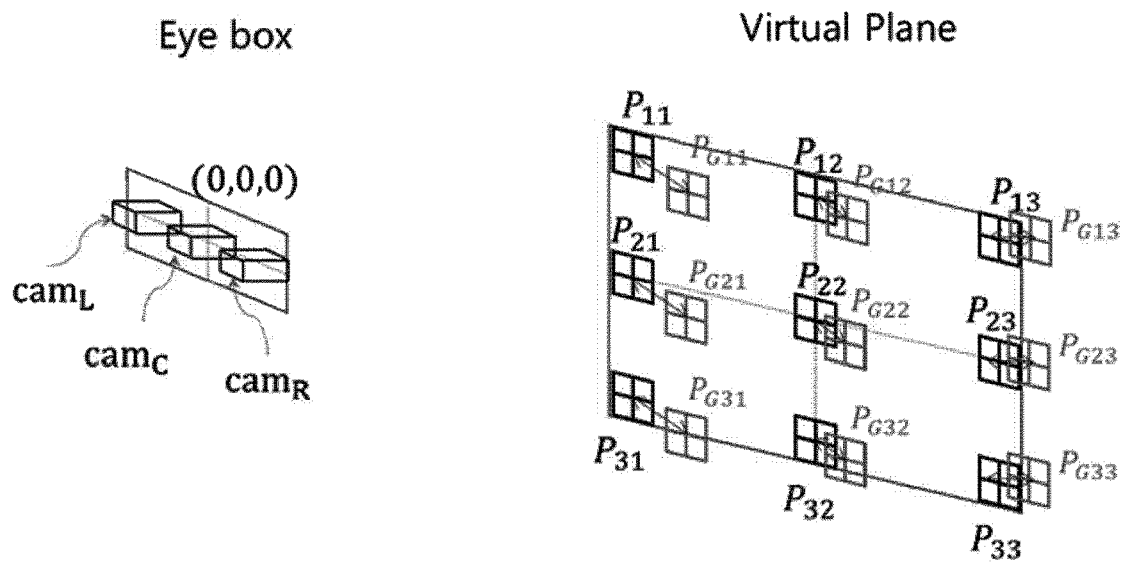
FIG. 17 is a diagram for explaining a method of calculating a ghosting level according to an exemplary embodiment of the present invention.

For example, a ghost pattern may be generated on an automotive windshield that transmits a half of input light and reflects the other half. In more detail, referring to FIG. 17, two physical layers of a windshield cause a ghost phenomenon, so a pattern on a virtual plane and a ghost pattern corresponding to the pattern may be seen overlapping like double images or may be seen blurred to a user.

In this case, the apparatus for measuring optical characteristics may calculate the coordinates of a plurality of ghost patterns corresponding to the coordinates of a plurality of patterns, respectively, in the same way as the method of calculating the coordinates of a plurality of patterns.

Finally, in step S740, the apparatus for measuring optical characteristics may calculate ghosting levels on the basis of the coordinates of the plurality of patterns and the coordinates of the plurality of ghost patterns.

In this case, the apparatus for measuring optical characteristics may calculate a ghosting level from the gap between an original pattern and a corresponding ghost pattern.

In more detail, the apparatus for measuring optical characteristics may calculate a ghosting level, using Formula 8.

$$Ghost = \frac{\sum_{i=1}^{3}\sum_{j=1}^{3}\sqrt{(x_{ij}-x_{Gij})^2 + (y_{ij}-y_{Gij})^2 + (z_{ij}-z_{Gij})^2}}{9}$$ [Formula 8]

where Ghost is a ghosting level, $x_{ij}$, $y_{ij}$, and $z_{ij}$ are the x, y, and z coordinates of a horizontal i-th (i=1, 2, 3) and vertical j-th (j=1, 2, 3) pattern, and $x_{Gij}$, $y_{Gij}$, and $z_{Gij}$ are the x, y, and z coordinates of a horizontal i-th and vertical j-th ghost pattern.

Figure 8:
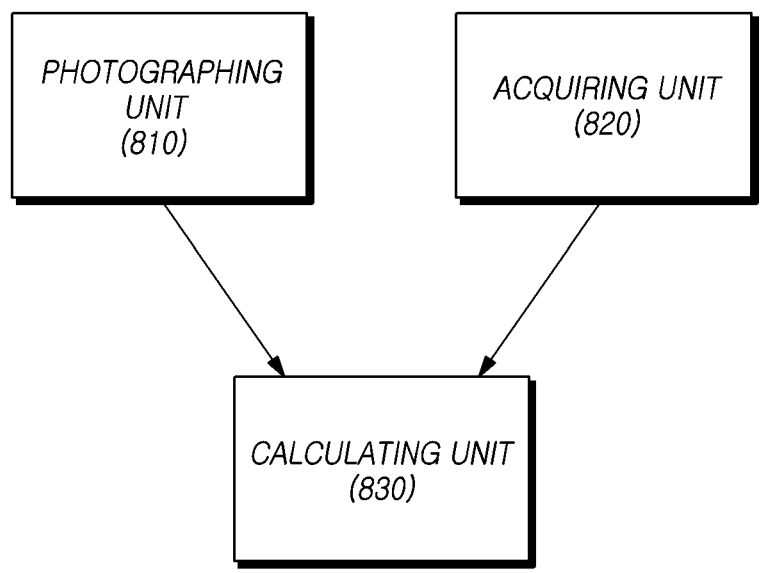
FIG. 8 is a block diagram showing an apparatus for measuring optical characteristics of an augmented reality device according to an exemplary embodiment of the present invention.

FIG. 8 is a block diagram showing an apparatus for measuring optical characteristics of an augmented reality device according to an exemplary embodiment of the present invention.

Referring to FIG. 8, an apparatus 800 for measuring optical characteristics of an augmented reality device according to an exemplary embodiment of the present invention includes a photographing unit 810, an acquiring unit 820, and a calculating unit 830.

The photographing unit 810 takes a test image including a plurality of patterns that is output on a virtual plane by an augmented reality device, using at least one camera disposed around a predetermined measurement reference position.

The acquiring unit 820 acquires field of view information including information about the field of view of the at least one camera, and photographing system information including information about the arrangement of the at least one camera.

Finally, the calculating unit 830 calculates the coordinates of a plurality of patterns with respect to the measurement reference position on the basis of a plurality of captured images taken by the at least one camera, field of view information, and photographing system information.

In another exemplary embodiment, the at least one camera is a central camera positioned at the measurement reference position, and a left camera and a right camera symmetrically positioned with the measurement reference position therebetween. When a plurality of patterns is horizontally and vertically arranged in one test image, the calculating unit 830 may calculate the coordinates of a plurality of patterns, using the number of horizontal pixels of a plurality of captured images, the coordinates of a plurality of patterns in the plurality of captured images, the field of view of at least one camera included in field of view information, and the distance between the left camera and the right camera included in the photographing system information.

In another exemplary embodiment, the calculating unit 830 may calculate the coordinates of a plurality of patterns, using Formula 9.

$$z_{ij} = \frac{\alpha}{2\cdot\tan\frac{\theta}{2}} \cdot \frac{M}{(m^L_{ij}-m^R_{ij})}$$ [Formula 9]

$$x_{ij} = z_{ij} \cdot \tan\frac{\theta}{2}\left(2\cdot\frac{m^C_{ij}}{M}-1\right)$$

$$y_{ij} = z_{ij} \cdot \tan\frac{\theta}{2}\left(2\cdot\frac{n^C_{ij}}{M}-1\right)$$

where $x_{ij}$, $y_{ij}$, and $z_{ij}$ are x-axial, y-axial, and z-axial coordinates of the horizontal i-th and vertical j-th pattern with respect to the measurement reference position, $\alpha$ is the distance between the left camera and the right camera, M is the number of horizontal pixels of a plurality of captured images, $\theta$ is the field of view of at least one camera, $m^L_{ij}$ is the horizontal coordinate of the horizontal i-th and vertical j-th pattern in the captured image of the left camera, $m^R_{ij}$ is the horizontal coordinate of the horizontal i-th and vertical j-th pattern in the captured image of the right camera, and $m^C_{ij}$ is the horizontal coordinate of the horizontal i-th and vertical j-th pattern in the captured image of the central camera.

In another exemplary embodiment, the calculating unit 830 may further calculate a virtual image distance between a measurement reference position and a virtual plane, using the coordinates of the measurement reference position and the coordinates of at least one of a plurality of patterns on the virtual plane.

In another exemplary embodiment, the calculating unit 830 may calculate a virtual image distance, using Formula 10.

$$D_{VI} = \sqrt{x_{22}^2 + y_{22}^2 + z_{22}^2} \quad \text{[Formula 10]}$$

where $D_{VI}$ is a virtual image distance, and $x_{22}$, $y_{22}$, and $z_{22}$ are the coordinates of one of a plurality of patterns.

In another exemplary embodiment, the calculating unit 830 may further calculate a look down/up angle from a measurement reference position to a virtual plane, using the coordinates of the measurement reference position and the coordinates of at least one of a plurality of patterns on the virtual plane.

In another exemplary embodiment, the calculating unit 830 may calculate look down/up angle, using Formula 11.

$$\theta_{down/up} = \cos^{-1} \frac{\sqrt{x_{22}^2 + z_{22}^2}}{\sqrt{x_{22}^2 + y_{22}^2 + z_{22}^2}} \quad \text{[Formula 11]}$$

where $\theta_{down/up}$ is a look down/up angle, and $x_{22}$, $y_{22}$, and $z_{22}$ are the coordinates of one of a plurality of patterns.

In another exemplary embodiment, the calculating unit 830 may further calculate the horizontal field of view of a measurement reference position, using the coordinates of the measurement reference position and the coordinates of two patterns positioned at both horizontal ends of a plurality of patterns on a virtual plane.

In another exemplary embodiment, the calculating unit 830 may calculate a horizontal field of view, using Formula 12.

$$\theta_{FOV}^{H} = \cos^{-1} \frac{\|\overline{P_{21}O}\|^2 + \|\overline{P_{23}O}\|^2 - \|\overline{P_{21}P_{23}}\|^2}{2 \cdot \|\overline{P_{21}O}\| \|\overline{P_{23}O}\|} \quad \text{[Formula 12]}$$

where $\theta^{H}_{FOV}$ is a horizontal field of view, O is the coordinate of a measurement reference position, and $P_{21}$ and $P_{23}$ are coordinates of two patterns positioned at both horizontal ends.

In another exemplary embodiment, the calculating unit 830 may further calculate the virtual field of view of a measurement reference position, using the coordinates of the measurement reference position and the coordinates of two patterns positioned at both virtual ends of a plurality of patterns on a virtual plane.

In another exemplary embodiment, the calculating unit 830 may calculate a virtual field of view, using Formula 13.

$$\theta_{FOV}^{V} = \cos^{-1} \frac{\|\overline{P_{12}O}\|^2 + \|\overline{P_{32}O}\|^2 - \|\overline{P_{12}P_{32}}\|^2}{2 \cdot \|\overline{P_{12}O}\| \|\overline{P_{32}O}\|} \quad \text{[Formula 13]}$$

where $\theta^{V}_{FOV}$ is a vertical field of view, O is the coordinate of a measurement reference position, and $P_{12}$ and $P_{32}$ are coordinates of two patterns positioned at both vertical ends.

In another exemplary embodiment, the calculating unit 830 may further calculate a static distortion for each of three axes with respect to a measurement reference position on the basis of the coordinates of a plurality of patterns on a virtual plane.

In another exemplary embodiment, the calculating unit 830 may further calculate the coordinates of a plurality of ghost patterns corresponding to the coordinates of a plurality of patterns, respectively, on the basis of a plurality of captured images, field of view information, and photographing system information, and may further calculate ghosting levels on the basis of the coordinates of the plurality of patterns and the coordinates of the plurality of ghost patterns.

Meanwhile, the exemplary embodiments of the present invention described above may be written as programs that can be executed in a computer and may be implemented in a common digital computer that executes the programs using a computer-readable recording medium.

The computer-readable recording medium includes a magnetic storage medium (e.g., a ROM, a floppy disk, and a hard disk) and an optical reading medium (e.g., a CD-ROM and a DVD).

Preferred exemplary embodiments of the present invention were described. It would be understood by those skilled in the art that the present invention may be modified without departing from the scope of the present invention. Therefore, the disclosed exemplary embodiments should be considered in terms of explaining, not limiting. The scope of the present invention is not shown in the above description, but claims, and all differences within an equivalent range should be construed as being included in the present invention.

The invention claimed is:

1. A measuring configuration method for a virtual image by an apparatus, the method comprising:
generating images including points in each pattern for a virtual image plane by using one or more light measuring devices,
wherein each image is captured based on the one or more light measuring devices, and
wherein each image corresponds to at least one of a left image, a center image, or a right image; and
generating positions of the points based on the one or more light measuring devices and each pattern,
wherein the positions are obtained based on a field of view of the one or more light measuring devices, a gap between a left light measuring device and a right measuring device, and
wherein coordinates of the positions are calculated based on a horizontal pixel index of the left light measuring device, a horizontal pixel index of the right light measuring device, a horizontal pixel index of a center light measuring device, and the field of view of the one or more light measuring devices.

2. The method according to claim 1,
wherein the left image including points in a pattern is captured based on the left light measuring device of the one or more light measuring devices, the center image including points in a pattern is captured based on the center light measuring device of the one or more light measuring devices, and the right image is captured based on the right measuring device of the one or more light measuring devices.

3. The method according to claim 1, the method further comprising,
measuring a virtual image distance for the virtual image plane based on a position in the pattern for a center and the one or more light measuring devices.

4. The method according to claim 3, the method further comprising,
measuring a look down angle and a look over angle for the virtual image plane based on the position in the pattern and the virtual image distance.

5. The method according to claim 1, the method further comprising, measuring a horizontal field of view for the virtual image plane based on a distance for a left point of a center and a distance for a right point of the center, and measuring a vertical field of view for the virtual image plane based on a distance for a top point of the center and a distance for a bottom point of the center.

6. The method according to claim 1, the method further comprising, measuring a horizontal distortion for the virtual image plane based on a center and a line between a top point of the center and a bottom point of the center, and measuring a vertical distortion for the virtual image plane based on the center and a line between a left point of the center and a right point of the center.

7. An apparatus for measuring light, the apparatus comprising:

an acquirer configured to acquire images including points in each pattern for a virtual image plane by using one or more light measuring devices, wherein each image is captured based on the one or more light measuring devices, and wherein each image corresponds to at least one of a left image, a center image, or a right image; and processor configured to generate positions of the points based on the one or more light measuring devices and each pattern, wherein the positions are obtained based on a field of view of the one or more light measuring devices, a gap between a left light measuring device and a right measuring device, and wherein coordinates of the positions are calculated based on a horizontal pixel index of the left light measuring device, a horizontal pixel index of the right light measuring device, a horizontal pixel index of a center light measuring device, and the field of view of the more or more light measuring devices.

8. The apparatus according to claim 7, wherein the left image including points in a pattern is captured based on the left light measuring device of the one or more light measuring devices, the center image including points in a pattern is captured based on the center light measuring device of the one or more light measuring devices, and the right image is captured based on the right measuring device of the one or more light measuring devices.

9. The apparatus according to claim 7, wherein the processor is further configured to measure a virtual image distance for the virtual image plane based on a position in the pattern for a center and the one or more light measuring devices.

10. The apparatus according to claim 9, wherein the processor is further configured to measure a look down angle and a look over angle for the virtual image plane based on the position in the pattern and the virtual image distance.

11. The apparatus according to claim 7, wherein the processor is further configured to measure a horizontal field of view for the virtual image plane based on a distance for a left point of a center and a distance for a right point of the center, and measure a vertical field of view for the virtual image plane based on a distance for a top point of the center and a distance for a bottom point of the center.

12. The apparatus according to claim 7, wherein the processor is further configured to measure a horizontal distortion for the virtual image plane based on a center and a line between a top point of the center and a bottom point of the center, and measure a vertical distortion for the virtual image plane based on the center and a line between a left point of the center and a right point of the center.

* * * * *